United States Patent
Park et al.

(10) Patent No.: US 9,842,080 B2
(45) Date of Patent: Dec. 12, 2017

(54) BIDIRECTIONAL COMMUNICATION METHOD AND BIDIRECTIONAL COMMUNICATION APPARATUS USING THE SAME

(71) Applicant: Anapass Inc., Seoul (KR)

(72) Inventors: Joon Bae Park, Seoul (KR); Do Wan Kim, Seoul (KR); Jin Up Lim, Seoul (KR); Sang June Kim, Seoul (KR); In Soo Lee, Seoul (KR)

(73) Assignee: ANAPASS INC., Seoul (KR)

( * ) Notice: Subject to any disclaimer, the term of this patent is extended or adjusted under 35 U.S.C. 154(b) by 140 days.

(21) Appl. No.: 14/903,147

(22) PCT Filed: Jul. 2, 2015

(86) PCT No.: PCT/KR2015/006791
§ 371 (c)(1),
(2) Date: Jan. 6, 2016

(87) PCT Pub. No.: WO2016/003207
PCT Pub. Date: Jan. 7, 2016

(65) Prior Publication Data
US 2016/0147703 A1 May 26, 2016

(30) Foreign Application Priority Data
Jul. 2, 2014 (KR) .......... 10-2014-0082330

(51) Int. Cl.
*G06F 13/42* (2006.01)
*G06F 1/04* (2006.01)
(Continued)

(52) U.S. Cl.
CPC .......... *G06F 13/4278* (2013.01); *G06F 1/12* (2013.01); *G06F 13/14* (2013.01)

(58) Field of Classification Search
None
See application file for complete search history.

(56) References Cited

U.S. PATENT DOCUMENTS

2005/0094462 A1* 5/2005 Jakobs ............... G11C 7/1078
365/222
2009/0051675 A1 2/2009 Huang
(Continued)

FOREIGN PATENT DOCUMENTS

KR      10-0822307 B1    4/2008
KR  10-2009-0019666 A    2/2009
(Continued)

OTHER PUBLICATIONS

International Search Report for PCT/KR2015/006791 dated Oct. 16, 2015 from Korean Intellectual Property Office.

*Primary Examiner* — Hyun Nam
(74) *Attorney, Agent, or Firm* — Paratus Law Group, PLLC (57) ABSTRACT

A communication method according to the present embodiment is a communication method between a first side and a second side operating with a clock provided by the first side, and includes a phase calibration step, a step of transmitting a command packet to the second side by the first side, and a data transmission and reception step of transceiving data packets according to the command packet between the first side and the second side. The phase calibration step is performed to calibrate phases of a transmit sampling clock of the first side and a receive sampling clock of the first side.

27 Claims, 7 Drawing Sheets

(51) Int. Cl.
*G06F 13/14* (2006.01)
*G06F 1/12* (2006.01)

(56) References Cited

U.S. PATENT DOCUMENTS

| | | | |
|---|---|---|---|
| 2009/0079477 A1 | 3/2009 | Lee | |
| 2009/0240994 A1 | 9/2009 | Lee | |
| 2009/0251181 A1* | 10/2009 | Bae | G11C 7/22 327/156 |
| 2010/0169699 A1* | 7/2010 | Fujimoto | G06F 13/4291 713/503 |
| 2013/0159657 A1* | 6/2013 | Zerbe | G06F 13/1689 711/167 |
| 2014/0118038 A1* | 5/2014 | Lin | H03L 7/105 327/149 |
| 2015/0163050 A1 | 6/2015 | Han et al. | |

FOREIGN PATENT DOCUMENTS

| | | |
|---|---|---|
| KR | 10-2009-0101053 A | 9/2009 |
| KR | 10-23010-0076914 A | 7/2010 |
| WO | 2014-007578 A1 | 1/2014 |

\* cited by examiner

BIDIRECTIONAL COMMUNICATION METHOD AND BIDIRECTIONAL COMMUNICATION APPARATUS USING THE SAME

CROSS REFERENCE TO PRIOR APPLICATION

This application is a National Stage Patent Application of PCT International Patent Application No. PCT/KR2015/006791 (filed on Jul. 2, 2015) under 35 U.S.C. §371, which claims priority to Korean Patent Application No. 10-2014-0082330 (filed on Jul. 2, 2014), which are all hereby incorporated by reference in their entirety.

TECHNICAL FIELD

The present invention relates to a bidirectional communication method and a bidirectional communication apparatus using the same.

BACKGROUND ART

According to a conventional bidirectional communication method, a phase-locked loop (PLL) or a clock data recovery (CDR) circuit is formed on both a first side and a second side. When the first side transmits a clock signal, the second side recovers the clock signal and then transmits the data. Likewise, when a clock signal is transmitted in the reverse direction, the clock signal is recovered, and then data is transceived.

DISCLOSURE

Technical Problem

A bidirectional communication method according to conventional art involves a process of recovering a clock, and thus the process of recovering a clock is performed every time a transmitting side and a receiving side are changed. However, a locking time of a phase-locked loop (PLL) or a clock data recovery (CDR) circuit is consumed to recover a clock, and latency increases because the locking time is consumed every time a transmission and reception is changed. To reduce the latency, a parallel bus structure, a plurality of clock buses, and a plurality of control signal buses may be used. However, there may be signal skew between buses, and the number of pins of a chip is uneconomical to increase.

The present embodiment is proposed to solve these problems of conventional art and directed to providing a bidirectional communication method in which a transmitting side and a receiving side can be changed at a high speed without a phase locking time to perform data transmission, and a bidirectional communication apparatus using the same.

Technical Solution

One aspect of the present invention provides a communication method between a first side and a second side operating with a clock provided by the first side, the communication method including a phase calibration step, a step of transmitting, by the first side, a command packet to the second side, and a data transmission and reception step of transceiving data packets according to the command packet between the first side and the second side. The phase calibration step is performed to calibrate phases of a transmit sampling clock of the first side and a receive sampling clock of the first side.

Another aspect of the present invention provides a communication method in which a first side transmits data to a second side with a clock provided by the first side, the communication method including (a) changing, by the first side, a phase of the clock to generate preliminary clocks having target phases, (b) sampling, by the first side, a mutually predetermined training pattern with the preliminary clocks and transmitting sampled patterns to the second side, (c) sampling, by the second side, the received patterns with the clock, comparing sampled patterns with the predetermined training pattern, and transmitting comparison results, (d) selecting, by the first side, a preliminary clock as a transmit sampling clock according to the comparison results, and (e) sampling, by the first side, the data to be transmitted with the transmit sampling clock whose phase has been adjusted and transmitting sampled data to the second side.

Another aspect of the present invention provides a communication method in which a second side transmits data to a first side with a clock provided by the first side, the communication method including (a) transmitting, by the second side, a mutually predetermined training pattern to the first side, (b) changing, by the first side, a phase of the clock to generate preliminary clocks having target phases, (c) sampling, by the first side, the pattern provided by the second side with the preliminary clocks, and comparing sampled patterns with the predetermined training pattern, (d) selecting, by the first side, a preliminary clock as a receive sampling clock according to comparison results, and (e) sampling the data transmitted by the second side with the receive sampling clock.

Another aspect of the present invention provides a communication apparatus including a first side including a clock provider configured to provide a clock and a plurality of first-side data transceivers configured to provide data or receive data, a second side including a clock receiver and a plurality of second-side data transceivers configured to provide the data or receive the data, a data channel unit including data channels configured to separately connect the plurality of first-side data transceivers and the plurality of second-side data transceivers, and a clock channel configured to provide the clock from the first side to the second side. The first side and the second side operate with the clock.

Advantageous Effects

According to a communication method or a communication apparatus of the present embodiment, it is unnecessary to wait for a locking time of a phase locked loop (PLL) every time a transmitting side and a receiving side are changed, and thus a latency period is shortened.

DESCRIPTION OF DRAWINGS

FIGS. 3(A) and 3(B) are exemplary timing diagrams illustrating a transmit phase calibration process in which

MODES OF THE INVENTION

Since descriptions of the present invention are mere embodiments for structural or functional description, the scope of the present invention should not be interpreted as being limited to the exemplary embodiments disclosed below. In other words, the exemplary embodiment may be modified in various ways and implemented in various forms, and thus the scope of the present invention should be understood to include equivalents that may embody the technical spirit of the present invention.

Meanings of terms used herein should be understood as follows.

Singular forms are intended to include the plural forms as well, unless the context clearly indicates otherwise. It should be further understood that the terms "comprises," "comprising," "includes," and "including", when used herein, specify the presence of stated features, integers, steps, operations, elements, parts, or combinations thereof, but do not preclude the presence or addition of one or more other features, integers, steps, operations, elements, parts, or combinations thereof.

Steps may be performed in a different sequence from a described sequence unless the context clearly indicates a particular sequence. In other words, steps may be performed in the same sequence as the described sequence, may be performed substantially simultaneously, or may be performed in the reverse sequence.

Unless otherwise defined, all terms used herein have the same meaning as commonly understood by those of ordinary skill in the art to which the present invention pertains. It should be further understood that terms, such as those defined in commonly used dictionaries, should be interpreted as having a meaning that is consistent with their meaning in the context of the relevant art and will not be interpreted in an idealized or overly formal sense unless expressly so defined herein.

In this specification, signal lines are not classified according to type. Therefore, a data bus may be a single line for transmitting a single-ended signal, or a pair of lines for transmitting differential signals. Each line shown in drawings may be interpreted as a single signal or a bus signal which is composed of one or more analog signals or digital signals, and description thereof may be added in case of need.

Figure 1:
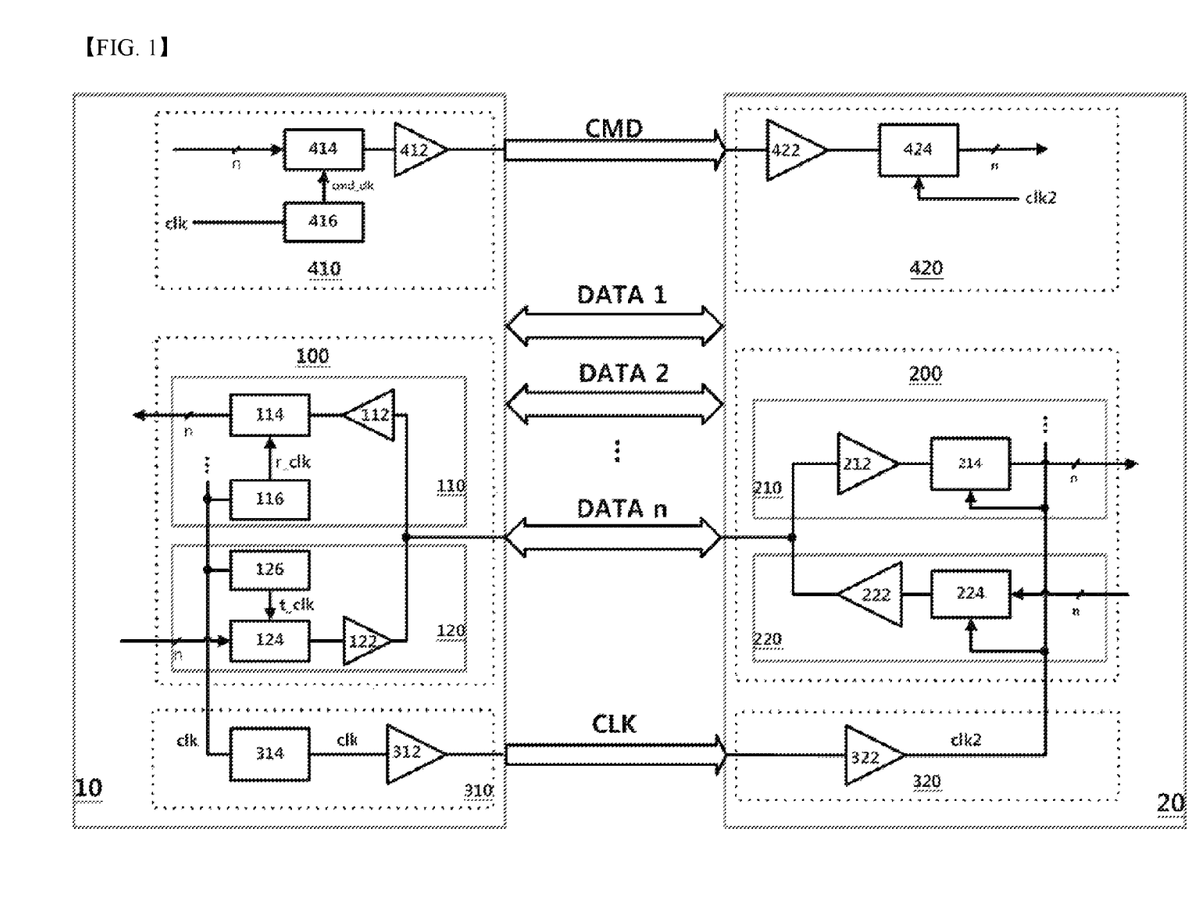
FIG. 1 is a block diagram outlining a communication apparatus according to the present exemplary embodiment.

Hereinafter, the present embodiment will be described with reference to the accompanying drawings. FIG. 1 is a block diagram outlining a communication apparatus according to the present embodiment. Referring to FIG. 1, the communication apparatus according to the present embodiment includes a first side 10 which transmits or receives data, and a second side 20 which receives the data transmitted by the first side 10 or transmits the data to the first side 10.

The first side 10 includes a clock provider 310 which provides a clock, and a plurality of data transceivers 100 which provide data or receive data. The second side 20 includes a clock receiver 320 and a plurality of data transceivers 200 which provide the data or receive the data. In an exemplary embodiment, the first side 10 may further include a command transmitter 410 which provides command packets, and the second side 20 may further include a command receiver 420 which receives the command packets.

The communication apparatus according to the present embodiment includes a data channel unit including data channels DATA 1, DATA 2, . . . , and DATA n which separately connect the plurality of first-side data transceivers 100 and the plurality of second-side data transceivers 200, a clock channel CLK which provides the clock from the first side 10 to the second side 20, and a command channel CMD which transmits the command packets. The first side 10 and the second side 20 operate with the same clock.

Figure 2:
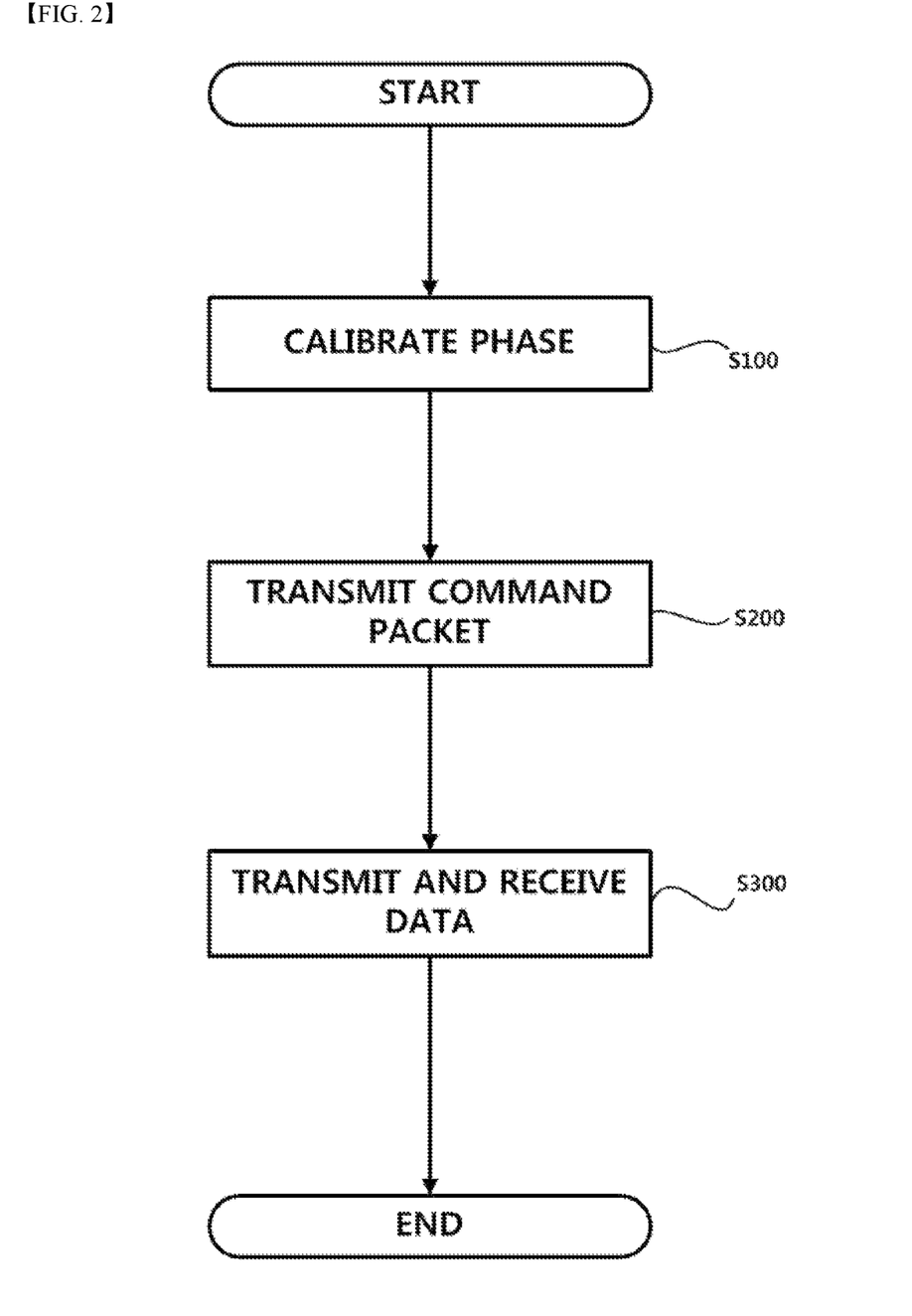
FIG. 2 is a flowchart outlining a communication method according to the present exemplary embodiment.

FIG. 2 is a flowchart outlining a communication method according to the present embodiment. Referring to FIG. 2, the communication method according to the present embodiment is a communication method between a first side and a second side which operates with a clock provided by the first side, and includes a phase calibration step (S100), a step of transmitting, by the first side, a command packet to the second side (S200), and a data transmission and reception step of transceiving data packets according to the command packet between the first side and the second side (S300). The phase calibration step is performed to calibrate phases of a transmit sampling clock of the first side and a receive sampling clock of the first side.

Referring to FIG. 1, the first side 10 includes the plurality of data transceivers 100. Each data transceiver 100 includes a receiver 110 and a transmitter 120. The receiver 110 includes a receive buffer 112 which receives serial data from a data channel, a deserializer 114 which deserializes the serial data and provides the deserialized data to an internal circuit of the first side 10, and a receive phase adjuster 116 which receives a common clock clk from the clock provider 310 to generate a receive sampling clock r_clk, and provides the receive sampling clock r_clk to the deserializer 114. The deserializer 114 samples the serial data received from the data channel with the receive sampling clock r_clk, deserializes the sampled data, and provides the deserialized data to the first-side internal circuit (not shown).

The transmitter 120 includes a serializer 124 which receives parallel data from the first-side internal circuit (not shown) and serializes the parallel data, a transmit buffer 122 which provides the serialized data to the data channel, and a transmit phase adjuster 126 which receives the common clock clk from the clock provider 310 to generate a transmit sampling clock t_clk, and provides the transmit sampling clock t_clk to the serializer 124. The serializer 124 converts the parallel data received from the first-side internal circuit into a serial signal, samples the serial signal with the transmit sampling clock t_clk, and transmits the sampled serial signal to the data channel.

In one exemplary embodiment, the command transmitter 410 includes a serializer 414 which receives the command packet from the first-side internal circuit (not shown) and serializes the received command packet, a command buffer 412 which transmits the serialized command packet to the second side 20 through the command channel CMD, and a command phase adjuster 416 which receives the clock clk from the clock provider 310 to generate a command sampling clock cmd_clk, and provides the command sampling clock cmd_clk to the serializer 414.

The clock provider 310 includes a clock generator 314 and a clock buffer 312. The clock generator 314 includes a voltage controlled oscillator (VCO), a crystal oscillator (XO), and a phase locked loop (PLL) or a delay locked loop. The clock generator 314 provides a signal provided by the VCO or the XO to the PLL or the delay locked loop, thereby generating a clock signal having a target frequency. The clock signal clk provided by the clock generator 314 functions as a clock which is provided to the first side 10 and the second side 20 in common. The clock buffer 312 transmits the clock clk provided by the clock generator 314 to the second side 20 through the clock channel CLK. The clock generator 314 provides the clock clk to the receive phase adjuster 116 and the transmit phase adjuster 126 through the clock buffer 312.

The clock clk generated by the clock provider 310 is provided to the second side 20 through the clock channel CLK, and the second side 20 samples data with a clock provided by the first side 10 and transmits the sampled data, or samples received data with the clock provided by the first side 10. The clock provided to the first side 10 and the clock provided to the second side 20 are generated by the clock provider 310, but phase skew occurs due to difference in electrical environments including a difference between voltages provided to the first side 10 and the second side 20, etc., difference between processes of forming the first side 10 and the second side 20, a temperature difference, and the transmitted clock channel CLK. The two clock signals between which the phase skew occurs have the same frequency but different phases. Therefore, when it is necessary to distinguish between the clock used on the first side 10 and the clock used on the second side 20, the clock used on the first side 10 is referred to as clk and the clock used on the second side 20 is referred to as clk2.

The second side 20 includes the clock receiver 320 which receives the clock from the clock channel CLK and provides the received clock to the plurality of data transceivers 200. The clock receiver 320 includes a clock buffer 322 which provides the clock clk2 to each of the data transceivers 200. As described above, unlike the first side 10, the second side 20 generates no clock. Therefore, the second side 20 receives a clock provided from the first side 10 and samples received data and data to transmit using the received clock clk2.

Each data transceiver 200 included in the second side 20 includes a receiver 210 and a transmitter 220. The receiver 210 includes a receive buffer 212 which buffers data received from a data channel and provides the data to a deserializer 214, and the deserializer 214 which deserializes the serial data provided by the receive buffer 212. The deserializer 214 receives the clock clk2 to sample the received data, deserializes the sampled data, and provides the deserialized data to a second-side internal circuit (not shown).

The transmitter 220 includes a serializer 224 which receives data to transmit from the second-side internal circuit (not shown) and serializes the data, and a transmit buffer 222 which transmits the serialized data to the data channel. The serializer 224 converts a parallel signal provided from the second-side internal circuit into a serial signal, samples the serial signal with the clock clk2, and transmits the sampled serial signal to the data channel.

The command receiver 420 receives the command packet from the command channel CMD, and provides the command packet to the second-side internal circuit (not shown). The command receiver 420 includes a deserializer 424 which samples the command packet received by the command buffer 422 with the clock clk2, deserializes the sampled command packet, and provides the deserialized command packet to the second-side internal circuit (not shown).

In one exemplary embodiment, the first side 10 may be implemented in a timing controller of a display device which displays images, and the second side 20 may be implemented as a memory which stores display image information. To implement a high information storage density, the memory is focused on forming a circuit composed of a repetitive regular pattern. Therefore, implementation of a clock generation circuit, a phase adjustment circuit, etc. having a non-repetitive and irregular layout on a memory may have problems in terms of die size and the level of difficulty of implementation. However, according to the present embodiment, it is possible to simultaneously operate a timing controller and a memory using a clock provided by the timing controller, and thus the problems of the conventional art can be solved. Also, the present embodiment provides advantages in that it is possible to implement a high information storage density and low latency.

The phase calibration step (see S100 in FIG. 2) includes a transmit phase calibration process of calibrating a phase of the transmit sampling clock t_clk used by the first side 10 to transmit data packets so that the second side 20 can validly sample the data packets transmitted from the first side 10, and a receive phase calibration process of calibrating a phase of the receive sampling clock r_clk used by the first side 10 to sample data packets so that the first side 10 can validly sample the data packets provided by the second side 20. In one exemplary embodiment, the phase calibration step further includes a process of calibrating a phase of the command sampling clock cmd_clk for sampling a command packet.

In this specification, the meaning of "valid sampling" represents that it is possible to sample bit information of a data holding period because an edge of a sampling clock used for sampling is not included in a data transition period.

Figure 3A:
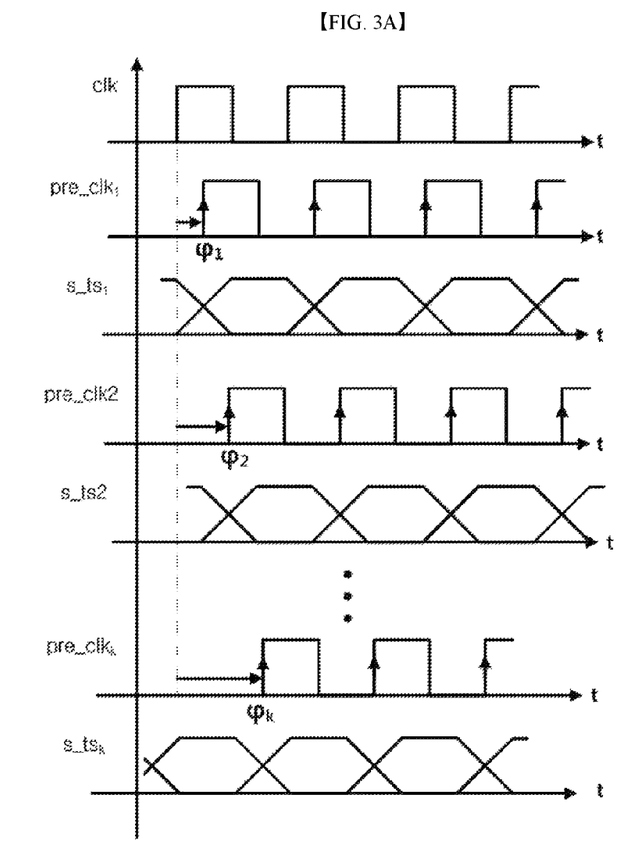
FIG. 3(A) is a schematic timing diagram illustrating a process in which a first side generates a plurality of preliminary clocks using a clock and generates training patterns sampled using the preliminary clocks.
Figure 3B:
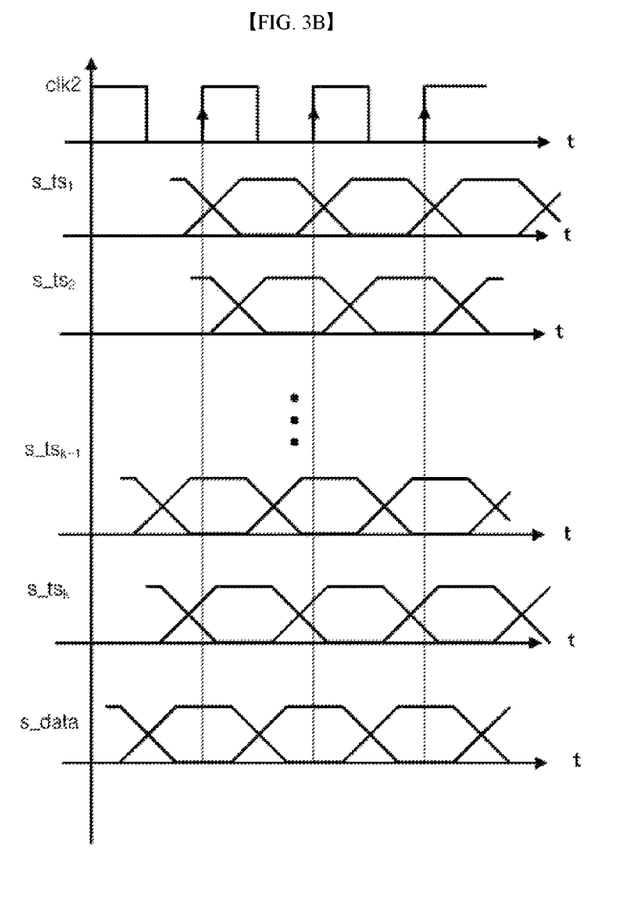
FIG. 3(B) is a schematic timing diagram illustrating a process in which a second side samples a received pattern with a clock.

FIGS. 3(A) and 3(B) are exemplary timing diagrams illustrating a transmit phase calibration process. FIG. 3(A) is a schematic timing diagram illustrating a process in which the first side 10 generates a plurality of preliminary clocks using a clock and generates training patterns sampled using the preliminary clocks, and FIG. 3(B) is a schematic timing diagram illustrating a process in which the second side 20 samples a received pattern with the clock clk2. Referring to FIG. 3(A), the transmit phase adjuster 126 receives the clock clk shown in FIG. 3(A) and generates a first preliminary clock pre_clk$_1$ having a phase $\Phi_1$. As one implementation example, the transmit phase adjuster 126 includes a phase interpolator, and generates a preliminary clock having a target phase by interpolating one period of the received clock signal clk. As another implementation example, the transmit phase adjuster 126 includes a delay element, and can generate a preliminary clock having a target phase by delaying the received clock signal clk for a target delay time.

The transmit phase adjuster 126 provides the generated first preliminary clock pre_clk$_1$ to the serializer 124, and the serializer 124 samples a training pattern mutually predetermined between the first side 10 and the second side 20 with the provided first preliminary clock pre_clk$_1$. For example, the training pattern may be provided by the first-side internal circuit (not shown). In another example, the training pattern may be a pattern set in the serializer 124.

As shown in the drawing, a training pattern s_ts1 sampled with the first preliminary clock $pre\_clk_1$ has a phase corresponding to a phase of the preliminary clock used for sampling. The training pattern s_ts1 sampled with the first preliminary clock $pre\_clk_1$ is provided to the transmit buffer 122, and the transmit buffer 122 provides the sampled pattern s_ts1 to the second side 20 through the data channel.

The receive buffer 212 of the second side 20 receives and buffers the sampled training pattern s_ts1, and provides the sampled training pattern s_ts1 to the deserializer 214 of the second side 20. The deserializer 214 samples the received pattern with a sampling clock and deserializes the sampled pattern. The clock clk2 used for sampling on the second side 20 is provided to the second side 20 through the clock channel CLK different from the data channel. Since there are differences in electrical conditions, such as a voltage difference, between the first side 10 and the second side 20 and differences in environmental conditions, such as temperature, humidity, etc. between places at which the first side 10 and the second side 20 are positioned, the clock clk2 provided to the second-side deserializer 214 has a different phase than the clock clk provided to the first side 10.

When the training pattern transmitted by the first side 10 is sampled with clk2, a problem is whether or not it is possible to validly sample the training pattern. Therefore, as will be described below, when the training pattern is sampled with the clock clk2, a preliminary clock having a phase for recovering the training pattern on the second side 20 is detected, and data packets are sampled using such a clock as a sampling clock and transmitted to the second side 20.

In FIG. 3(B), as described above, a phase difference between the clock clk2 of the second side 20 and the sampled training pattern s_ts1 received by the second side 20 differs from a phase difference between the clock clk of the first side 10 and the sampled training pattern s_ts1. For example, when the deserializer 214 performs sampling with a rising edge of the clock clk2, the rising edge of the clock clk2 is positioned in a bit transition period of the training pattern s_ts1, and thus it is not possible to accurately sample bits of the training pattern s_ts1. Therefore, when the pattern s_ts1 is sampled with the clock clk2, the sampled pattern is not the same as the predetermined training pattern. In this case, the second side 20 transmits an inconsistency signal to the first side 10. As one exemplary embodiment, the inconsistency signal may be transmitted through a data channel through which phase calibration is not performed among the plurality of data channels.

The transmit phase adjuster 126 receives the clock clk to generate a second preliminary clock $pre\_clk_2$ having a phase $\Phi_2$ different from the phase $\Phi_1$ of the first preliminary clock $pre\_clk_1$, and provides the second preliminary clock $pre\_clk_2$ to the serializer 124. The serializer 124 samples the predetermined training pattern with the provided second preliminary clock $pre\_clk_2$, thereby generating a sampled training pattern s_ts2. As described above, a phase of a sampled training pattern corresponds to a phase of a clock used for sampling.

The serializer 124 provides the sampled training pattern s_ts2 to the transmit buffer 122, and the transmit buffer 122 provides the sampled training pattern s_ts2 to the second side 20 through the data channel. The receive buffer 212 of the second side 20 buffers the sampled training pattern s_ts2 and provides the sampled training pattern s_ts2 to the deserializer 214. The deserializer 214 samples the sampled training pattern s_ts2 with the clock clk2. As shown in FIG. 3(B), a phase of the training pattern s_ts2 sampled with the second preliminary clock $pre\_clk_2$ differs from a phase of the training pattern s_ts1 sampled with the first preliminary clock $pre\_clk_1$. Since a rising edge of the clock clk2 with which sampling is performed is out of a bit transition period, it is possible to validly sample the sampled training pattern s_ts2. Therefore, a result of sampling the training pattern s_ts2 with the clock clk2 is consistent with the predetermined training pattern. The second side 20 transmits a consistency signal to the first side 10 through another data channel in which phase calibration is not performed.

The transmit phase adjuster 126 generates preliminary clocks whose phases are changed in sequence, and provides the respective preliminary clocks to the serializer 124, thereby generating training patterns sampled with the respective preliminary clocks. The sampled training patterns generated in this way show a phase shift shown in FIG. 3(B). Therefore, when $s\_ts_{k-1}$ is sampled, a rising edge of the clock clk2 is out of a bit transition period, and it is possible to validly sample a pattern. However, when $s\_ts_k$ is sampled, a rising edge of the clock clk2 is included in a bit transition period, and it is not possible to validly sample a pattern. Therefore, the second side 20 transmits a consistency signal until $s\_ts_{k-1}$ is sampled, and transmits an inconsistency signal to the first side 10 when s_tsk is sampled due to the sampled training pattern differing from the predetermined training pattern.

The first side 10 determines a phase range of a preliminary clock in which the consistency signal is received. Referring to FIG. 3(B), it is possible to validly sample patterns from $s\_ts_2$ to $s\_ts_{k-1}$ with the clock clk2. Therefore, in one exemplary embodiment, the first side 10 selects, as the transmit sampling clock t_clk, a preliminary clock having any one phase within a range from a phase of a clock signal $pre\_clk_2$ with which $s\_ts_2$ is sampled to a phase of a clock signal $pre\_clk_{k-1}$ with which $s\_ts_{k-1}$ is sampled. In another exemplary embodiment, the first side 10 selects, as the transmit sampling clock t_clk, a preliminary clock having a phase in the middle of the range from the phase of the clock signal $pre\_clk_2$ with which $s\_ts_2$ is sampled to the phase of the clock signal $pre\_clk_{k-1}$ with which $s\_ts_{k-1}$ is sampled.

In FIG. 3(B), s_data is a timing diagram showing a case in which the first side 10 selects a preliminary clock having the phase in the middle of the range as the transmit sampling clock t_clk, and the second side 20 receives data s_data sampled with the transmit sampling clock t_clk. As shown in the drawing, sampling edges of the clock clk2 are positioned so that bits of the sampled data s_data can be sampled.

Figure 4:
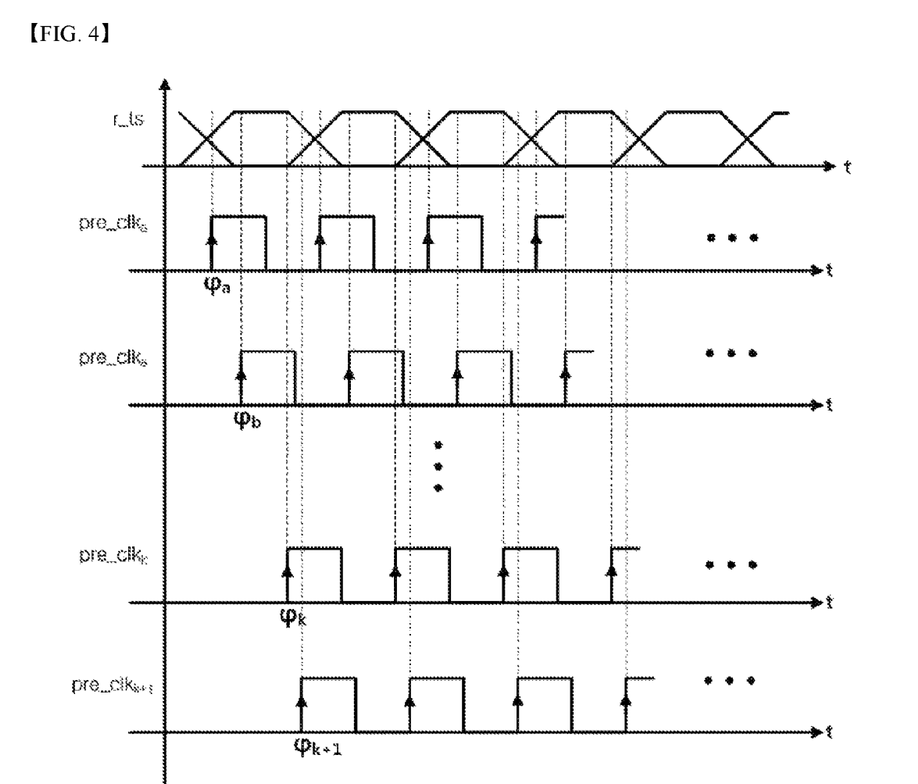
FIG. 4 shows exemplary timing diagrams illustrating a receive phase calibration process.

FIG. 4 shows exemplary timing diagrams illustrating a receive phase calibration process. Referring to FIG. 4, for example, the internal circuit (not shown) of the second side 20 provides the predetermined training pattern to the serializer 224, and the serializer 224 samples the provided training pattern with the clock clk2 and provides the sampled training pattern to the data channel through the transmit buffer 222. The receive buffer 112 of the first side 10 receives a training pattern r_ts provided by the second side 20 through the data channel, and buffers and provides the training pattern r_ts to the deserializer 114. In another example, the predetermined training pattern may be set in the serializer 224.

The pattern r_ts is obtained by sampling with the clock clk2 of the second side 20 and transmission. As described above, the clock clk2 of the second side 20 has a phase difference from the clock clk of the first side 10, and thus a receive sampling clock for sampling should be generated on the first side 10. The receive phase adjuster 116 receives the clock clk and generates a preliminary clock pre_clk$_a$ having a phase of $\Phi_a$. The receive phase adjuster 116 provides the generated preliminary clock pre_clk$_a$ to the deserializer 114, and the deserializer 114 samples the pattern r_ts with the provided preliminary clock pre_clk$_a$.

In an example, the receive phase adjuster 116 may be implemented as a phase interpolator which receives the clock clk and generates a preliminary clock having a target phase by interpolating the phase. In another example, the receive phase adjuster 116 may include a delay element which receives the clock clk and generates a preliminary clock having a target phase by delaying the clock clk for a predetermined delay time.

As shown in the drawing, a rising edge of the preliminary clock pre_clk$_a$ on which the deserializer 114 performs sampling is in a bit transition period of the pattern r_ts, and thus it is not possible to validly sample the pattern r_ts. Therefore, when a sampling result and the predetermined training pattern are compared, it is possible to determine that they are different from each other. In one exemplary embodiment, the first side 10 may transmit an inconsistency signal to the second side 20.

The receive phase adjuster 116 generates a preliminary clock pre_clk$_b$ having a phase of $\Phi_b$ by adjusting a phase of the clock clk, and provides the preliminary clock pre_clk$_b$ to the deserializer 114. A rising edge of the preliminary clock pre_clk$_b$ on which the deserializer 114 performs sampling is out of a bit transition period of the pattern r_ts, and thus it is possible to validly sample the pattern r_ts. Therefore, when a sampling result and the predetermined training pattern are compared, it is possible to determine that they are the same.

The receive phase adjuster 116 generates preliminary clocks while sequentially changing the phase of the clock clk, and sequentially provides the generated preliminary clocks to the deserializer 114. The deserializer 114 samples the pattern r_ts with the provided preliminary clocks, and determines whether or not the sampled pattern is consistent with the predetermined training pattern. As shown in FIG. 4, a preliminary clock pre_clk$_k$ having a phase of $\Phi_k$ has a rising edge positioned out of a bit transition period of the pattern r_ts, and thus the deserializer 114 can validly sample the pattern r_ts. However, a preliminary clock pre_clk$_{k+1}$ having a phase of $\Phi_{k+1}$ has a rising edge positioned in a bit transition period of the pattern r_ts, and thus it is not possible to validly sample the pattern r_ts.

In one exemplary embodiment, the first side 10 selects any one of a preliminary clock pre_clk$_b$ having a b$^{th}$ phase $\Phi_b$ to a preliminary clock pre_clk$_k$ having a k$^{th}$ phase $\Phi_a$ as the receive sampling clock r_clk to sample data provided by the second side 20.

In another exemplary embodiment, the first side 10 may determine the range of phases of preliminary clocks at which a pattern can be validly sampled, and select a preliminary clock having a phase in the middle of the phase range as the receive sampling clock r_clk. In an example, when phases of preliminary clocks at which a pattern can be validly sampled are three consecutive phases of an a$^{th}$ phase $\Phi_a$, a b$^{th}$ phase $\Phi_b$, and a c$^{th}$ phase $\Phi_c$, the first side 10 can select a preliminary clock having the b$^{th}$ phase $\Phi_b$ in the middle of the phases as the receive sampling clock r_clk. In another example, when phases of preliminary clocks at which a pattern can be validly sampled are four consecutive phases of an a$^{th}$ phase $\Phi_a$, a b$^{th}$ phase $\Phi_b$, a c$^{th}$ phase $\Phi_c$, and a d$^{th}$ phase $\Phi_d$, the first side 10 can select any one of the b$^{th}$ phase $\Phi_b$ and the c$^{th}$ phase $\Phi_c$ in the middle of the phases as the receive sampling clock r_clk.

In one exemplary embodiment, the phase calibration process further includes a command clock phase calibration process of sampling a command packet provided by the first side 10. The command packet is provided from the first side 10 to the second side 20, and a process of calibrating a phase of a command sampling clock is similar to the above-described process of calibrating a phase of a transmit sampling clock. The command packet is provided from the internal circuit (not shown) of the first side 10 to the serializer 414, and the serializer 414 samples the command packet with the command sampling clock cmd_clk and transmits the sampled command packet to the second side 20.

The second side 20 receives the command packet through the command channel CMD, and the command buffer 422 buffers and provides the received command packet to the deserializer 424. The deserializer 424 samples the command packet with the clock clk2, deserializes the sampled command packet, and provides the deserialized command packet to the second-side internal circuit (not shown). In one exemplary embodiment, the command phase adjuster 416 receives the common clock clk, generates a preliminary clock having a target phase, samples a training pattern with the preliminary clock, and provides the sampled training pattern to the second-side command receiver 420.

The deserializer 424 samples the received pattern with the second-side clock clk2, determines whether or not the sampled pattern is consistent with the predetermined training pattern, and provides a consistency or inconsistency signal to the first side 10. As will be described below, there are three types of channels through which information is transmitted between the first side 10 and the second side 20, the clock channel CLK, the data channels DATA 1 to DATA n, and the command channel CMD. Among these channels, bidirectional transmission is enabled only in the data channels DATA 1 to DATA n. Therefore, the second-side internal circuit (not shown) transmits the consistency or inconsistency signal to the first side 10 through a data channel.

For example, the second-side internal circuit (not shown) can transmit the consistency or inconsistency signal by causing all the data channels DATA 1 to DATA n to transmit logic 1 or logic 0 to the first side 10 in the process of calibrating a phase of a command sampling clock. In another example, the second-side internal circuit (not shown) can transmit the consistency or inconsistency signal through any one data channel predetermined between the first side 10 and the second side 20.

The command phase adjuster 416 can determine the range of phases of preliminary clocks at which the deserializer 424 can validly sample the training pattern from consistency and inconsistency signals. For example, the command phase adjuster 416 can select a preliminary clock having a phase in the middle of the phase range as the command sampling clock cmd_clk. In another example, the command phase adjuster 416 can select a preliminary clock having any one phase within the phase range as the command sampling clock cmd_clk.

A result of phase calibration can vary according to all channels including the data channels and the command channel. Therefore, phase calibration is adjusted or grouped according to the respective channels.

Each of the plurality of transceivers 100 included in the first side 10 performs a phase calibration process to generate a transmit sampling clock and a receive sampling clock. When the plurality of transceivers 100 included in the first side 10 simultaneously perform phase calibration, there may be a lack of channels for transmitting consistency signals and/or inconsistency signals, and a phase calibration process of forming a transmit sampling clock may require an excessively long time. In one exemplary embodiment, all the data transceivers 100 can be classified into two groups to separately perform phase calibration processes. In another exemplary embodiment, all the data transceivers 100 can be classified into even-numbered data transceivers and odd-numbered data transceivers and separately perform phase calibration processes.

In one exemplary embodiment, when the first side 10 and the second side 20 transceiver data in units of frames composed of a plurality of lines, phase calibration is performed after data transmission and reception of a predetermined number of frames is finished. Since a phase may be changed by changes of voltages and environments provided to the first side 10 and the second side 20, it is possible to reduce data transmission errors resulting from a phase change by performing phase calibration after data transmission and reception of the predetermined number of frames is finished. Therefore, the phase calibration step is periodically performed when frame data transmission and reception is periodically performed, and the phase calibration step is aperiodically performed when data transmission and reception is not periodically performed. For example, phase calibration can be performed in a vertical blank period after data transmission and reception of the predetermined number of frames is finished.

In another exemplary embodiment, phase calibration can be performed in a blank period in which any one of the first side 10 and the second side 20 does not operate. For example, when the first side 10 is a data transmission chip and the second side 20 is a dynamic random access memory (DRAM), the DRAM cannot receive or output data in a refresh period. Therefore, the first side 10 cannot perform phase calibration in a refresh period of the memory.

In other words, the phase calibration step is periodically performed when memory refresh is periodically performed, and the phase calibration step is aperiodically performed when memory refresh is aperiodically performed, In one exemplary embodiment, when the apparatus including the first side 10 and the second side 20 is supplied with power and initially operated, the first side 10 and the second side 20 perform the phase calibration step. The phase calibration step performed upon the initial operation is finished after a command sampling clock, a transmit sampling clock, and a receive sampling clock are all generated.

The first side 10 transmits a command packet to the second side 20 (S200; see FIG. 2). The command packet is a packet for the first side 10 to instruct the second side 20 to perform a process. The command packet may be, for example, a read packet RD for the first side 10 to read information stored in the second side 20, a write packet WR for writing information provided by the first side 10 on the second side 20, a refresh packet RF for performing a refresh when the second side 20 is a DRAM, and so on.

Also, the command packet can include a row address strobe (RAS) packet for designating a row address of the second side 20 and a column address strobe (CAS) packet for designating a column address of the second side 20, and can also include a no operation (NOP) packet indicating that there is no command. Those of ordinary skill will be able to define and use command packets in various forms other than command packets exemplified in the following description.

Figure 5:
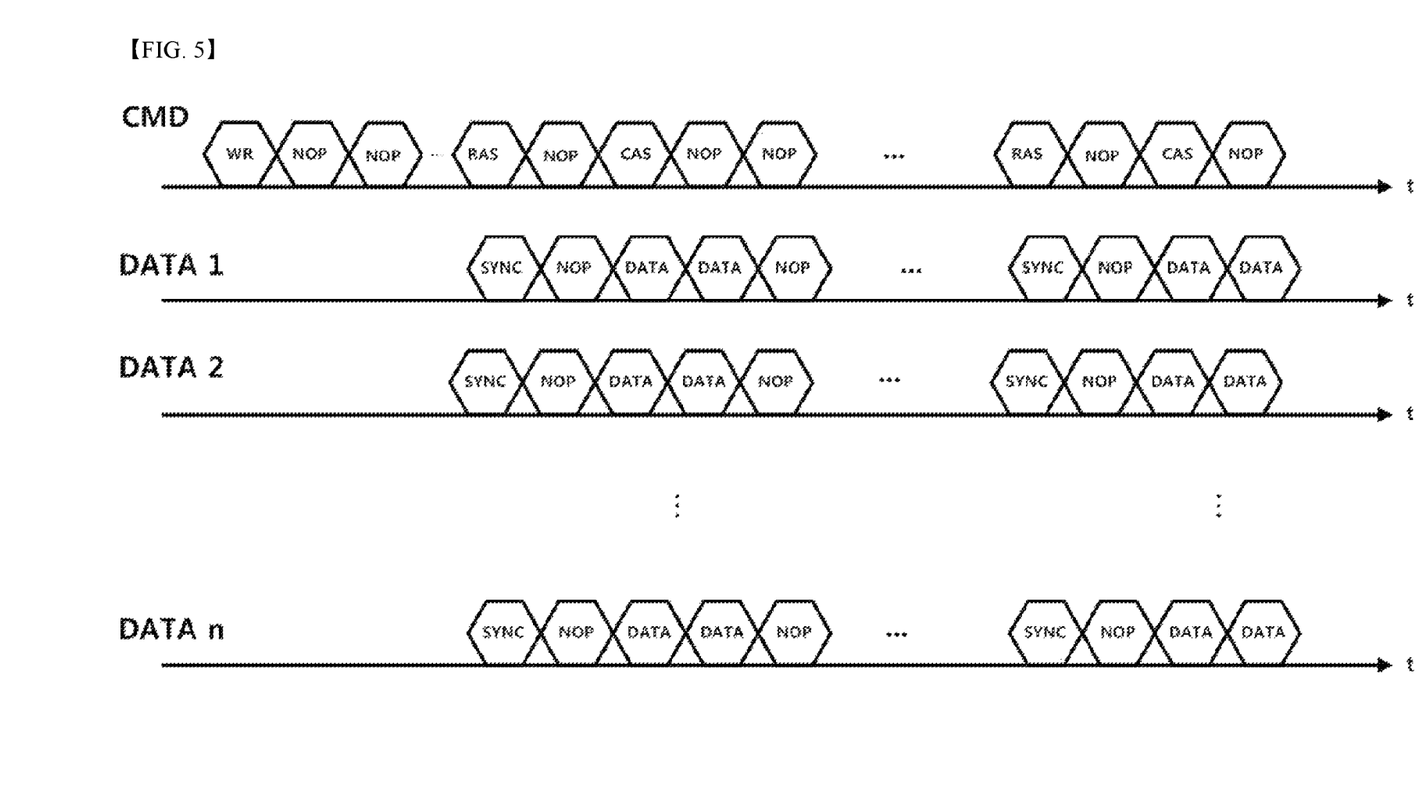
FIG. 5 is a timing diagram schematically showing a process in which a first side writes stored data to a second side.

FIG. 5 is a timing diagram schematically showing a process in which a first side writes stored data to a second side. With reference to FIG. 5, a process of writing data provided by a first side to a second side will be described.

The first side 10 transmits a write packet WR through the command channel CMD (S200; see FIG. 2). The first side 10 transmits a plurality of NOP packets, thereby ensuring time for the second side 20 to receive and decode the write packet WR and perform an internal process. For example, the number of transmitted NOP packets may vary according to a time taken for second-side decoding and the internal process.

After an adequate number of NOP packets are transmitted, the first side 10 transmits an RAS packet through the command channel CMD, and transmits a sync packet SYNC through the data channels DATA 1, DATA 2, ..., and DATA n. The synch packet SYNC is a packet for indicating the beginning of data when the data is transmitted from the first side 10 to the second side 20 or vice versa.

While transmitting a CAS packet through the command channel CMD, the first side 10 transmits data to write through the data channels DATA 1, DATA 2, ..., and DATA n. FIG. 5 shows that two packets are transmitted through each data channel, but the number of data packets transmitted through each channel can vary. The second side 20 decodes data provided through the data channels DATA 1, DATA 2, ..., and DATA n, and stores the decoded data at addresses designated by the RAS packet and the CAS packet. As shown in the drawing, by transmitting another RAS packet and another CAS packet, it is possible to additionally transmit data. Although not shown in the drawing, by transmitting any one of an RAS packet or a CAS packet, it is possible to additionally transmit data to be stored in the corresponding row or column.

As shown in FIG. 5, packets transmitted from the first side 10 to the second side 20 do not have the same phase. This is because channel-specific data receivers 210 of the second side 20 set transmit sampling clocks t_clk so that the transmitted packets can be validly sampled with the second-side clock clk2 regardless of clock skew occurring due to a voltage change and a temperature change between the first side 10 and the second side 20. Therefore, packets transmitted through the respective data channels DATA 1, DATA 2, ..., and DATA n and the command channel CMD can have different phases.

Figure 6:
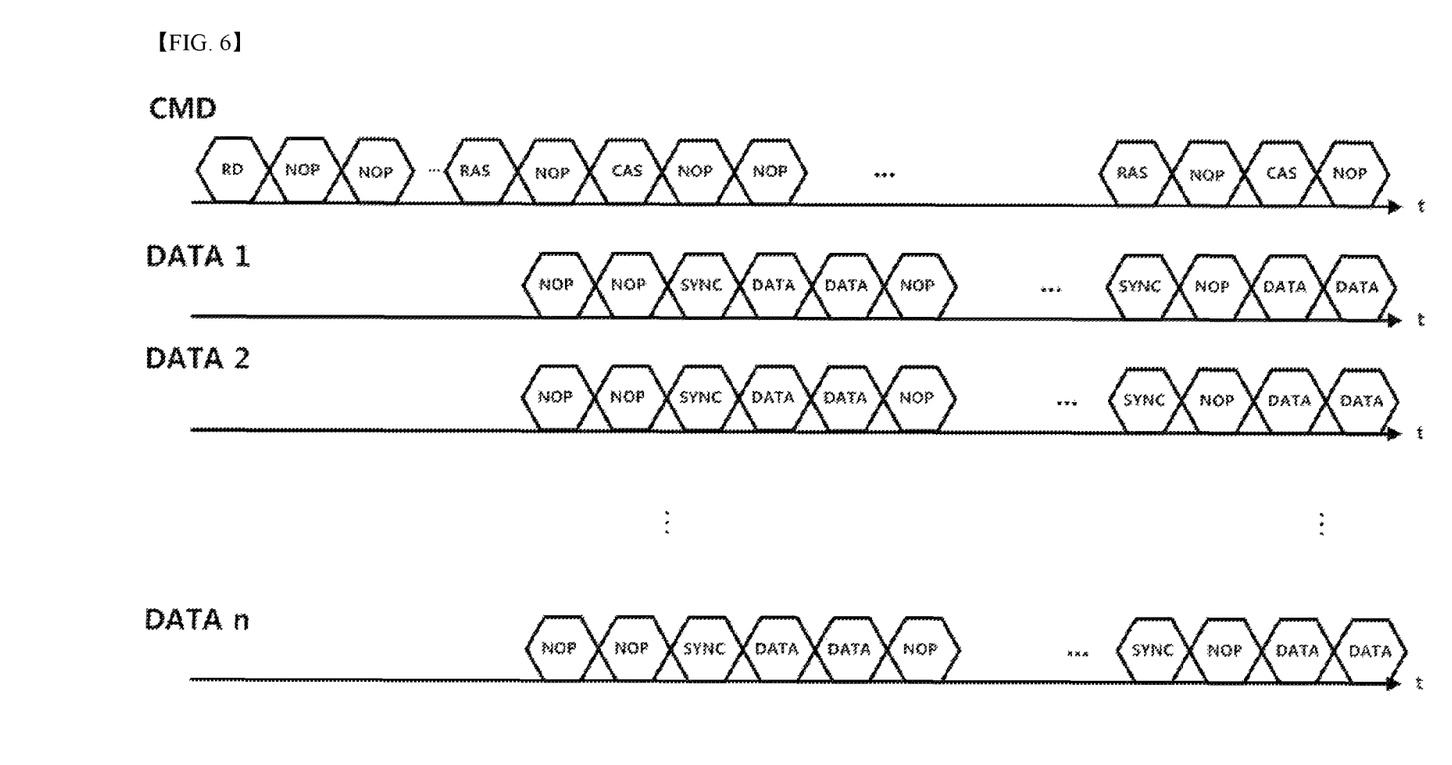
FIG. 6 is a timing diagram schematically showing a process in which a first side 10 reads data stored in a second side 20.

FIG. 6 is a timing diagram schematically showing a process in which the first side 10 reads data stored in the second side 20. With reference to FIG. 6, a process in which the first side 10 reads data stored in the second side 20 will be described. The first side 10 transmits a read packet RD through the command channel CMD (S200; see FIG. 2). Like the writing process, the first side 10 transmits a plurality of NOP packets, so that the second side 20 receives the read packet RD and performs an internal process, such as decoding or so on.

By transmitting an RAS packet and a CAS packet through the command channel CMD, the first side 10 provides addresses of data to be read to the second side 20. The second side 20 fetches data using the addresses designated by the RAS packet and the CAS packet. The second side 20 performs a predetermined decoding process on the fetched data, and transmits the decoded data to the first side 10 through the data channels DATA 1, DATA 2, ..., and DATA n.

Like the writing process, by transmitting another RAS packet and another CAS packet through the command channel CMD, it is possible to additionally read data. Although not shown in the drawing, by transmitting any one of an RAS packet or a CAS packet, it is possible to additionally transmit data to be stored in the corresponding row or column.

As shown in FIG. 6, data packets provided from the second side 20 through the data channels DATA 1, DATA 2, . . . , and DATA n are sampled with the second-side clock clk2 and transmitted. Although not shown in the drawing, clock skew may occur due to a voltage difference, a temperature difference, etc. between the first side 10 and the second side 20. However, each first-side data receiver 110 sets receive sampling clocks r_clk to overcome phase skew and sample data in a phase calibration process. Therefore, it is possible to validly sample the data packets in spite of phase skew.

Figure 7:
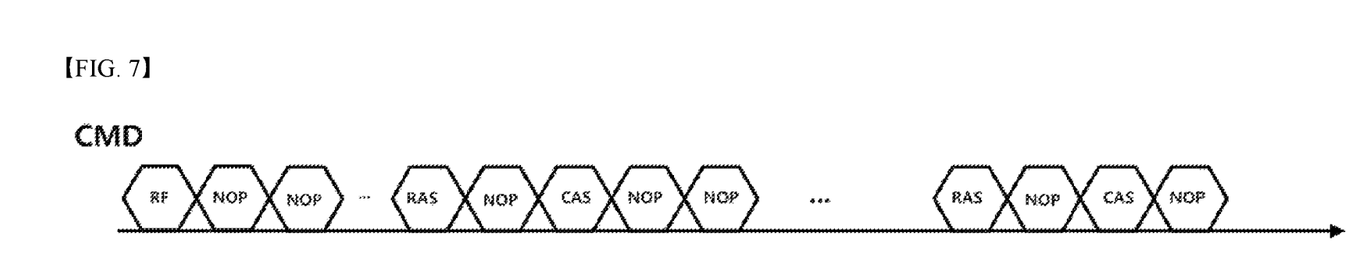
FIG. 7 is a diagram showing a process in which the second side 20 performs a refresh when the second side 20 is a dynamic random access memory (DRAM) requiring the refresh.

FIG. 7 is a diagram showing a process in which the second side 20 performs refresh when the second side 20 is a DRAM requiring refresh. Referring to FIG. 7, the first side 10 transmits a refresh packet RF through the command channel CMD. Like the reading process and the writing process described above, the first side 10 transmits a plurality of NOP packets to ensure a command decoding process. The first side 10 designates a row address and/or a column address requiring refresh with an RAS packet and a CAS packet respectively, and transmits the RAS packet and the CAS packet to the second side 20, so that refresh is performed.

According to the present embodiment, it is possible perform data communication between a first side and a second side using a clock signal provided by the first side, and a PLL or a clock data recovery (CDR) device does not perform clock locking even when a transmitting side and a receiving side are changed. Consequently, it is possible to reduce latency time.

While the invention has been shown and described with reference to a certain exemplary embodiment thereof, it will be understood by those skilled in the art that various changes in form and details may be made therein without departing from the spirit and scope of the invention as defined by the appended claims.

The invention claimed is:

1. A communication method between a first side and a second side operating with a clock provided by the first side, the communication method comprising:
    a phase calibration step;
    a step of transmitting, by the first side, a command packet to the second side; and
    a data transmission and reception step of transceiving data packets according to the command packet between the first side and the second side,
    wherein the phase calibration step is performed to calibrate phases of a receive sampling clock of the first side,
    wherein the phase calibration step comprises:
        providing, by the second side, a mutually predetermined training pattern to the first side;
        generating, by the first side, preliminary clocks from the clock;
        sampling, by the first side, the training pattern provided by the second side with the preliminary clocks;
        determining whether patterns sampled with the preliminary clocks are consistent with the predetermined training pattern; and
        selecting a preliminary clock having a phase which equalizes a pattern sampled with the preliminary clock to the predetermined training pattern as the receive sampling clock.

2. The communication method of claim 1, wherein the phase calibration step is performed so that a sampling edge of the receive sampling clock samples bits included in the training pattern.

3. The communication method of claim 1, wherein the phase calibration step is periodically performed.

4. The communication method of claim 1, wherein the phase calibration step is aperiodically performed.

5. The communication method of claim 1, wherein the first side is a timing controller,
    the second side is a memory, and
    the data packets are displayed on a display panel.

6. The communication method of claim 1, wherein the phase calibration step further comprises calibrating a phase of a command sampling clock for sampling the command packet transmitted from the first side to the second side.

7. A communication method in which a first side transmits data to a second side with a clock provided by the first side, the communication method comprising:
    (a) changing, by the first side, a phase of the clock to generate preliminary clocks having target phases;
    (b) sampling, by the first side, a mutually predetermined training pattern with the preliminary clocks and transmitting sampled patterns to the second side;
    (c) sampling, by the second side, the received patterns with the clock, comparing sampled patterns with the predetermined training pattern, and transmitting comparison results;
    (d) selecting, by the first side, a preliminary clock as a transmit sampling clock according to the comparison results; and
    (e) sampling, by the first side, the data to be transmitted with the transmit sampling clock whose phase has been adjusted and transmitting sampled data to the second side.

8. The communication method of claim 7, wherein step (a) is performed to delay or interpolate the clock so that the preliminary clocks have the target phases.

9. The communication method of claim 7, wherein step (a) to step (c) are performed a plurality of times, and
    the preliminary clocks are generated in different phases according to a number of times that step (a) to step (c) are performed.

10. The communication method of claim 9, wherein step (d) comprises:
    calculating a phase range of preliminary clocks in which comparison results indicate that sampled patterns are consistent with the predetermined training pattern; and
    determining a preliminary clock having a phase within the phase range as the transmit sampling clock.

11. The communication method of claim 7, wherein step (a) to step (d) are performed again after the transmission of the data to be transmitted is finished.

12. A communication method in which a second side transmits data to a first side with a clock provided by the first side, the communication method comprising:
    (a) transmitting, by the second side, a mutually predetermined training pattern to the first side;
    (b) changing, by the first side, a phase of the clock to generate preliminary clocks having target phases;
    (c) sampling, by the first side, the pattern provided by the second side with the preliminary clocks, and comparing sampled patterns with the predetermined training pattern;
    (d) selecting, by the first side, a preliminary clock as a receive sampling clock according to comparison results; and
    (e) sampling the data transmitted by the second side with the receive sampling clock.

13. The communication method of claim 12, wherein step (b) is performed to delay or interpolate the clock so that preliminary clocks have the target phases.

14. The communication method of claim 12, wherein step (a) to step (c) are performed a plurality of times, and
the preliminary clocks are generated in different phases according to a number of times that step (a) to step (c) are performed.

15. The communication method of claim 14, wherein step (d) comprises:
calculating a phase range of preliminary clocks in which comparison results indicate that sampled patterns are consistent with the predetermined training pattern; and
determining a preliminary clock having a phase included in the phase range as the receive sampling clock.

16. The communication method of claim 12, wherein step (a) to step (d) are performed again after transmission of the data to be transmitted is finished.

17. A communication apparatus comprising:
a first side including a clock provider configured to provide a clock, and a plurality of first-side data transceivers configured to provide data or receive data;
a second side including a clock receiver and a plurality of second-side data transceivers configured to provide the data or receive the data;
a data channel unit including data channels configured to separately connect the plurality of first-side data transceivers and the plurality of second-side data transceivers; and
a clock channel configured to provide the clock from the first side to the second side,
wherein the first side and the second side operate with the clock, and
wherein the plurality of first-side data transceivers comprise:
input units including deserializers configured to convert serial data provided from the data channels into parallel data and output the parallel data, and input phase adjustors configured to receive the clock, generate receive sampling clocks for sampling the parallel data from the clock, and provide the receive sampling clocks to the deserializers; and
output units including serializers configured to convert provided parallel data into serial data and output the serial data to the data channels, and output phase adjustors configured to receive the clock, generate transmit sampling clocks for sampling the serial data from the clock, and provide the transmit sampling clocks to the serializers.

18. The communication apparatus of claim 17, wherein a phase calibration step is performed, and
in the phase calibration step, the input phase adjusters sample a predetermined training pattern provided by the second side with preliminary receive clocks, determine whether sampled data is consistent with the predetermined training pattern, and select a preliminary receive clock as the receive sampling clock.

19. The communication apparatus of claim 17, wherein the second-side data transceivers comprise:
input units including deserializers configured to receive the serial data from the data channels, sample the serial data with the clock, convert sampled serial data into parallel data, and output the parallel data; and
serializers configured to receive parallel data, convert the received parallel data into serial data, sample the serial data with the clock, and provide the sampled serial data to the data channels.

20. The communication apparatus of claim 19, wherein a phase calibration step is performed, and
in the phase calibration step, the output phase adjusters sample a predetermined training pattern with preliminary transmit clocks and provide sampled patterns to the second side,
the input units of the second side sample the patterns provided by the first side, determine whether sampled data is consistent with the predetermined training pattern, and provide phase match signals to the first side, and
the first side selects a preliminary transmit clock as the transmit sampling clock.

21. The communication apparatus of claim 17, further comprising a command channel configured to provide a command packet to the second side,
wherein the first side further includes a command unit configured to provide the command packet.

22. A communication method between a first side and a second side operating with a clock provided by the first side, the communication method comprising:
a phase calibration step;
a step of transmitting, by the first side, a command packet to the second side; and
a data transmission and reception step of transceiving data packets according to the command packet between the first side and the second side,
wherein the phase calibration step is performed to calibrate phases of a transmit sampling clock of the first side,
wherein the phase calibration step comprises:
generating, by the first side, preliminary clocks from the clock;
sampling a predetermined training pattern with the preliminary clocks, and transmitting sampled patterns to the second side;
sampling, by the second side, the received patterns with the clock;
determining whether patterns sampled by the second side are consistent with the predetermined training pattern; and
selecting a preliminary clock having a phase which equalizes a pattern sampled with the clock to the predetermined training pattern as the transmit sampling clock.

23. The communication method of claim 22, wherein the phase calibration step is performed so that a sampling edge of the transmit sampling clock samples bits included in the training pattern.

24. The communication method of claim 22, wherein the phase calibration step is periodically performed.

25. The communication method of claim 22, wherein the phase calibration step is aperiodically performed.

26. The communication method of claim 22, wherein the first side is a timing controller,
the second side is a memory, and
the data packets are displayed on a display panel.

27. The communication method of claim 22, wherein the phase calibration step further comprises calibrating a phase of a command sampling clock for sampling the command packet transmitted from the first side to the second side.

* * * * *